July 8, 1952 G. ELLIS 2,602,839
CIRCUIT FOR OSCILLOGRAPH WITH PROVISION
FOR CALIBRATING DURING OPERATION
Filed May 9, 1950
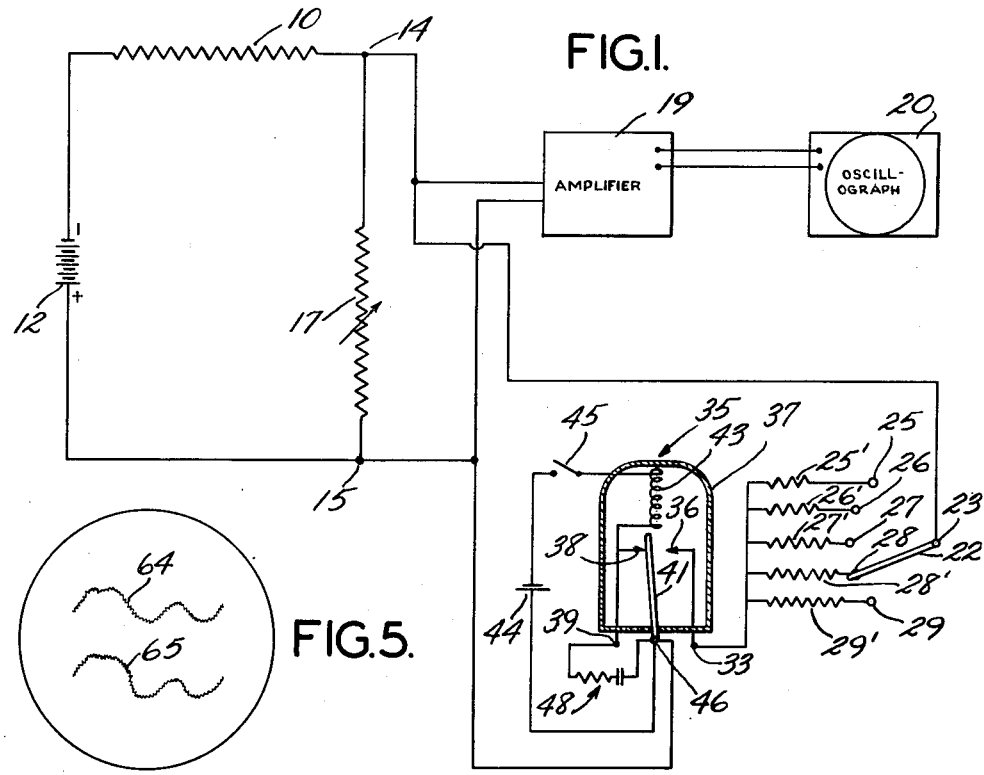
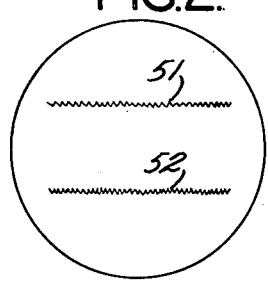
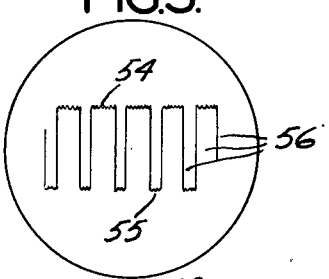
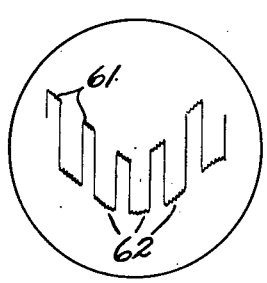
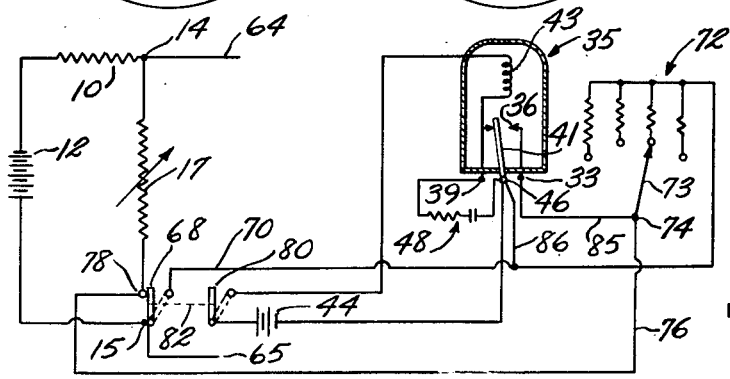
INVENTOR
Dren Ellis
BY
ATTORNEY Patented July 8, 1952

2,602,839

UNITED STATES PATENT OFFICE 2,602,839

CIRCUIT FOR OSCILLOGRAPH WITH PROVISION FOR CALIBRATING DURING OPERATION

Greer Ellis, Pelham, N. Y.

Application May 9, 1950, Serial No. 160,943

7 Claims. (Cl. 175—183)

This invention relates to circuits that are used for supplying power to an oscillograph from a strain gage, or any resistance, capacitance or other impedance transducer apparatus that modulates power from a source in a manner to produce measurement indications on a cathode ray, moving coil or other types of oscillograph screen record strips. The invention will be described as combined with an oscillograph having a sweep ray and a screen.

It is an object of this invention to provide circuits with suitable impedances and switch means that give improved calibration features. More particularly, the circuit of this invention provides for calibration at any time during a test and it is not dependent upon the maintenance of a standardized voltage or the balancing of a bridge circuit.

If the impedance of the signal circuit is a resistance, the invention uses resistances as calibration impedances. Similarly, capacitance or inductance impedances in the signal circuit are matched by calibration impedances of the same kind but of different value. Combinations of different kinds of impedances for the signal circuit are matched by similar combinations for calibration impedances.

The invention operates equally well with signal circuits of resistance, capacitance, inductance or any impedance combinations such as are employed in the known state of the art relating to such circuits.

In accordance with another feature of the invention, the transducer circuit is combined with an amplifier and oscillograph with a vibrator switch or other motor-operated switch connected in series with a calibrating circuit to produce a second line on the oscillograph for indicating calibration at any time during the use of the apparatus.

Another feature of the invention relates to the connection of a power-operated vibrator switch in the circuit with an oscillograph with provision for preventing extraneous electrical noise from the vibrator drive circuit from getting into the measuring circuit that drives the oscillograph.

Other objects, features and advantages of the invention will appear or be pointed out as the description proceeds.

In the drawing, forming a part hereof, in which like reference characters indicate corresponding parts in all the views, Fig. 1 is a diagrammatic view showing an example of this invention comprising a simple unbalanced resistance transducer circuit combined with an amplifier and an oscillograph.

Figs. 2 to 5 are diagrams showing the calibration produced by the apparatus shown in Fig. 1.

Fig. 6 is a view similar to Fig. 1 but showing a modified form of the invention.

The signal circuit of this example of the invention includes a blocking resistor 10 connected with a source of power, comprising a battery 12, and having terminals 14 and 15 across which a gage 17 or other variable load is connected. This load, the variations of which are to be measured, may be a strain gage, or any resistance transducer for measuring displacement, load, pressure, or other physical conditions.

It is evident that the resistor 10 is necessary as a "ballast resistor" in order to obtain signals from variations in the gage 17. Without this ballast resistor, the voltage measured across the gage 17 would be merely the terminal voltage of the battery 12.

The terminals 14 and 15 also connect with an amplifier 19 that supplies power to the oscillograph 20 through suitable conductors. The amplifier 19 in the example is an alternating current amplifier using electronic tubes. The oscillograph is a cathode ray instrument having provision for sweeping the ray across the screen at an adjustable and controlled freqency. The construction of such amplifiers and oscillographs are well understood in the art, and a detailed description of them is not necessary for a complete understanding of this example of the invention.

The terminal 14 of the signal circuit is connected with a calibration circuit including a switch arm 22. Switch contacts 25–29, inclusive, of the calibration circuit each connect with a precision calibration resistor of different value. These resistors are designated by the same reference characters as their associated contacts 25–29 but with a prime appended, and they are connected with a common terminal 33 of a vibrator switch indicated by the general reference character 35.

The terminal 33 of the vibrator connects with a fixed contact 36 in a housing 37 that encloses the vibrator, and there is another fixed contact 38 in the vibrator with a terminal 39. A reed 41 vibrates between the contacts 36 and 38 and touches the respective contacts at opposite ends of its stroke. Motive power for the reed is supplied by an operating coil 43 of the vibrator switch. This coil is in the circuit of the fixed contact 38 and is connected outside of the vibrator housing with a battery 44. There is a manually operated switch 45 in series with the battery for starting and stopping the operation of the vibrator switch.

The reed 41 has a terminal 46 at its fixed end, and this terminal is connected with the other side of the battery 44. Whenever the coil 43 is energized, it pulls the reed 41 away from the fixed contact 38 and breaks the circuit through the coil 43. This causes the coil to be deenergized and the reed springs back against the contact 38, reestablishing the circuit through the coil 43 and battery 44. The reed is thus caused to vibrate, in a well known manner, by the power supplied from the battery 44.

The terminal 46 of the vibrator switch 35 is connected with the terminal 15 of the bridge so that with the parts in the positions shown in Fig. 1, there is a circuit from the terminal 14 of the bridge to the arm 22, and through the contact 28, resistor 28', vibrator terminal 33, fixed contact 36, reed 41, and terminal 46 of the vibrator back to the terminal 15 of the bridge. Any one of the resistors 25', 26', 27' or 29' can be connected across the resistance transducer 17, in place of the resistor 28', by merely moving the arm 22 into position to touch a different one of the contacts 25-29.

In order to prevent extraneous electrical noise from the drive circuit of the vibrator switch from getting into the measuring circuit to the amplifier 19, there is a filter 48 connected across the terminals 39 and 46 of the vibrator switch 35. In order to minimize extraneous currents coupling into the conductors that are common to the measuring circuit and the driving circuit of the vibrator switch, it is important to have the filter 48 connected directly to the terminal 46. The filter is less effective if it is connected at some intermediate point along the conductor that leads from the terminal 46 to the battery 44 or if connected with some intermediate point along the conductor that connects the vibrator terminal 46 with the bridge terminal 15.

Another feature for reducing extraneous electrical noise is the location of the vibrator drive contact 38 on the opposite side of the reed from the resistor connecting contact 36. By having these contacts on opposite sides of the reed and having contact 38 open before contact 36 closes, the battery circuit that operates the reed of the vibrator switch is always open when the circuit through the calibration resistors 25'-29' is closed. This feature is not essential, however, and when noise level is not critical, the vibrator switch can be made with the contact 38 on the same side of the reed as the contact 36 and with the motor coil 43 arranged to pull the reed away from both of the contacts.

The essential feature of the vibrator switch 35 is that it opens and closes the circuit through the calibration resistors 25'-29' automatically and with a predetermined controlled or regular frequency. The vibrator switch 35 is merely representative of switch means that open and close this circuit through the resistors 25'-29' automatically with a predetermined frequency and in accordance with a controlled cycle of operation.

When the circuit through the vibrator switch 35 is open, the amplifier 19 is supplied with the full voltage across the resistance transducer 17, and any changes in the resistance of the transducer 17 cause corresponding changes in the input voltage of the amplifier 19.

Connecting a high resistance, such as the resistor 29', in parallel with the resistance transducer 17, induces a change in voltage across the terminals 14 and 15 proportional to the total change in resistance in identical manner to change in transducer resistance.

Calibration signals add directly to any signals coming from the transducer. It is to be understood that in normal practice the change in total impedance by addition of the calibration impedance, is sufficiently less than the impedance of the transducer so that the normal operation of the transducer is not sensibly affected by the calibration operation.

Figure 2 shows the calibration of the apparatus when there is no signal from the transducer 17, that is, the transducer 17 is in its original condition or subject to a static load. Two lines 51 and 52 are seen on the oscillograph screen. The upper line 51 is produced by the sweep of the ray across the screen while the calibration circuit through the vibrator switch 35 is open; and the lower line 52 is produced by the sweep of the ray across the screen during the time that the calibration circuit through the vibrator switch 35 is closed.

The spacing of the lines 51 and 52 from one another, that is, the calibration of the apparatus, depends upon which of the calibration resistors 25'-29' is connected in series with the vibrator switch 35. The lines 51 and 52 are actually made by the same ray which moves up and down with each opening and closing of the vibrator switch 35, but in Fig. 2 the sweep of the oscillograph ray is not in phase with the oscillations of the vibrator 35 and the vertical lines between the lines 51 and 52 are, therefore, haphazard and not visible.

Fig. 3 shows the condition that is obtained when the sweep of the oscillograph is in phase with the oscillations of the vibrator switch 35. There are upper horizontal lines 54 corresponding to the line 51 of Fig. 2, and there are lower horizontal lines 55 corresponding to the line 52 of Fig. 2. Because of the fact that the ray moves up and down at the same places on the oscillograph screen during each sweep in Fig. 3, there are vertical lines 56 at each opening and closing of the vibrator switch 35. As in the case of Fig. 2, Fig. 3 shows results obtained with no load or a static load on the transducer.

Fig. 4 shows a number of short lines 61 on the oscillograph screen representing signals from the transducer 17 when subject to varying or vibrating load. These lines 61 would join into a continuous line if the vibrator switch were not used, but the amplitude of the vibrations in Fig. 4 would be of no significance unless the observer knew the calibration of the apparatus. This calibration can be determined by closing the manually-operated switch 45 so that the vibrator switch comes into operation and produces a series of lines 62 corresponding to each closing of the circuit through one of the calibration resistors 25'-29'.

If the conditions under which the apparatus is being used change, and the amplification of the signals being supplied to the oscillograph is varied, then in order to maintain a reasonable amplitude of the oscillograph indication, the calibration of the apparatus can also be changed without making any change in the load, or the strain gage or other transducer, merely by moving the calibrating arm 22 one way or the other to obtain a reasonable amplitude of the calibration signal for best calibration purposes.

The calibration system can be applied to any section of the signal circuit and its effect on the transducer arms can be computed from the known constants of the bridge.

Figure 5 shows conditions similar to Fig. 4 but with the signal frequency substantially higher than the frequency of the calibration switch. As in the case of Fig. 2, two separate lines 64 and 65 are obtained and the vertical lines connecting them are haphazard and not visible. The upper line 64 corresponds to the circuit conditions when the calibrating switch 35 is open, and the lower line 65 corresponds with the circuit conditions when the calibrating switch 35 is closed.

Fig. 6 shows an alternative method for producing acceptable calibration signals. A small value of suitable calibration impedance is introduced in series with the transducer. This can be done, as shown in Figure 6, by alternately shorting out the selected calibration value. Because of more critical circuit conditions, such as an error from switch contact resistance in these low impedance circuits, the paralleling method previously described is usually preferred.

In Fig. 6 the calibration impedances are inserted in series with the transducer 17. This figure shows terminals 14 and 15 with conductors 64 and 65 for connection with the oscillograph through an amplifier in the manner similar to Fig. 1. Between the terminal 15 and the transducer 17, however, there is a switch element 68 that closes the circuit between the transducer 17 and the terminal 15 when in the solid line position shown. This switch element 68 can be moved into the dotted line position shown in the drawing, and when in such position, it connects the terminal 15 with a conductor 70 leading to a group of calibration impedances designated generally by the reference character 72. An arm 73 moves about a center terminal 74 and can be shifted to connect the terminal 74 with any selected one of the impedances 72.

The terminal 74 is connected by a conductor 76 to a switch contact 78 which the switch element 68 touchs when in the full line position shown in the drawing. The terminal 78 is also connected with the terminal 33 of the vibrator switch or chopper 35.

The vibrator switch or chopper 35 has a filter 48 connected across its terminals 39 and 46, as in the combination shown in Fig. 1. The power circuit for the operating coil of the vibrator switch 35 has a battery 44 and is otherwise similar to the power circuit of the vibrator switch of Fig. 1 except that the circuit shown in Fig. 6 has a manually operated switch element 80 which is connected to the switch element 68 by a mechanical linkage 82.

When the switch elements 68 and 80 are in their full line positions, the transducer 17 is connected directly with the terminal 15 and both the chopper 35 and calibrating impedances 72 are out of the circuit. When the switch elements 68 and 80 are shifted into their dotted line positions, the transducer 17 is connected in series with a selected calibrating impedance of the impedances 72 through switch contact 78, conductor 76, arm 73 and conductor 70 which carries the circuit back to the contact 15. The vibrator switch or chopper 35 is connected in parallel with the calibration impedances 72 through a conductor 85 that joins the center terminal 74 with the chopper terminal 33, and through a conductor 86 that joins the center terminal 46 of the chopper 35 to the conductor 70.

When the reed 41 of the chopper 35 touches the contact 36, the calibration impedances 72 are short circuited and only the transducer 17 is across the terminals 14 and 15. Whenever the reed 41 is away from the contact 36, a selected impedance of the calibration impedances 72 is connected in series with the transducer 17 across the terminals 14 and 15.

An important requirement of this invention is that the calibration switch operate in a consistently repetitive manner, for haphazard operation of the calibration switch in conjunction with the A. C. amplifiers normally used would cause the calibration signal to so erratically move up and down on the oscillograph face as to become virtually useless.

The preferred embodiment of the invention has been illustrated and described, but changes and modifications can be made and some features can be used alone or in different combinations without departing from the invention as defined in the claims.

What is claimed is:

1. Measuring apparatus comprising a circuit, including an impedance transducer in series with another impedance, connections at opposite ends of the circuit through which power is supplied to the circuit for causing the impedance transducer to generate signals, a calibration impedance of a predetermined known value and of a type and size that gives calibration signals comparable to the transducer signals when inserted in the transducer circuit and supplied with power from the same source as said connections at the opposite ends of the circuit, consistent repetitive switching means that move into one position to remove the calibration impedance from the transducer circuit so that the signals generated are the effect of the transducer on the power supplied without effect from the calibration impedance and that move into another position to insert said impedance into the transducer circuit so that the signals generated by the transducer are modified by the impedance, and conductors through which signals in the circuit supply power to an oscillograph independently of the position of said repetitive switching means.

2. Measuring apparatus comprising a circuit, including an impedance transducer in series with another impedance, connections at opposite ends of the circuit through which power is supplied to the circuit for causing the impedance transducer to generate signals, a calibration impedance of a predetermined known value and of a type and size that gives calibration signals comparable to the transducer signals when inserted in the transducer circuit and supplied with power from the same source as said connections at the opposite ends of the circuit, consistent repetitive switching means comprising a vibrator in series with the calibration impedance, a motor coil that operates the vibrator, a movable element in the vibrator that opens and closes the circuit of the calibration impedance and the motor coil circuit, a power source connected with the motor coil and a filter connected in the motor coil circuit parallel with the portion of the motor coil circuit that opens and closes during the operation of the vibrator.

3. Apparatus for supplying signals to power an oscillograph, said apparatus comprising an impedance transducer, another impedance connected in series with the transducer, connections at opposite ends of this series circuit to supply power to the circuit for causing the transducer to generate signals, a calibration impedance of a predetermined known value, switch means by which the calibration impedance is connected in the transducer circuit in position to modify the signals from that circuit, when the calibration impedance is supplied with power from the same series as the transducer and simultaneously with the supply of power to the transducer, said switch means including a vibrating reed fixed at one end, two relatively fixed contacts on opposite sides of the vibrating portion of the reed, a motor coil that causes the reed to oscillate consistently back and forth from one contact to the other, the motor coil being connected with one of the contacts and with a source of power, three terminals at one end of the vibrator switch, one of the terminals being located adjacent to the fixed end of the reed and each of the other two terminals being connected with a different one of the contacts between which the reed moves, a conductor connecting the contact opposite to the motor coil contact with the calibration impedance, conductors connecting the reed terminal of the vibrator switch with the motor coil power supply and with the transducer circuit, and a filter comprising a resistor and capacitor in series and connected directly with the reed terminal and the motor coil terminal of the vibrator switch.

4. Test apparatus comprising an impedance transducer that is subjected to the force to be measured, another impedance in series with the transducer, connections at opposite ends of said series circuit and through which power is supplied to the circuit for causing the transducer to generate signals, a plurality of calibration impedances of different and predetermined values, switch means movable into different positions to introduce different ones of the calibration impedances into a calibration circuit, conductors by which the calibration circuit is connected with the transducer circuit to receive signals from the same source of power that energizes the transducer circuit, and consistently repetitive switching means connected in series with the impedances and movable into different positions to open and close the calibration impedance circuit.

5. Measuring apparatus comprising an impedance transducer, another impedance in series with the transducer and forming therewith a signal generating circuit, connections at opposite ends of said circuit through which power is supplied to the circuit for causing the transducer to generate signals, a calibration impedance of predetermined value located in a calibration circuit, conductors by which the calibration circuit is connected in the transducer circuit, consistently repetitive switching means that alternately connect the calibration circuit with the transducer circuit and then disconnect the calibration circuit from the transducer circuit, said switch means comprising a vibrator in series with the calibration impedance and having a reed fixed at one end, two relatively fixed contacts on opposite sides of the vibrating motor coil that oscillates the reed back and forth into and out of contact with said relatively fixed contacts, said coil being connected with one of the contacts and with a battery, terminals located at one end of the vibrator switch and one of which is adjacent to the fixed end of the reed and one of which is connected with the relatively fixed contact that is in the vibrator coil circuit, and a conductor that is outside of the power supply circuit to the oscillograph and that connects the motor coil circuit to the terminal that is adjacent to the fixed end of the reed.

6. Apparatus for measuring voltage changes, said apparatus including two terminals across which is to be connected a circuit in which the voltage change is to be measured, a blocking impedance in series with the circuit to be measured, a power source connected across the series connected blocking impedance and circuit to be measured, a cathode ray oscillograph connected across said terminals through an amplifier for indicating a line representing a normal voltage across the terminals, a calibration circuit also connected across said terminals and deriving power from the same source as said circuit in which the voltage change is to be measured, a plurality of calibration impedances each of which is of predetermined value in the calibration circuit, switch means in the calibration circuit and in series with the calibration impedances, said switch means having a bias toward open position, a motor that operates the switch means to close and open the calibration circuit with consistently repetitive operation, a manually-operated control for stopping and starting the motor to make the calibration circuit effective to produce a second line on the oscillograph, and an adjustable conductor movable into different positions to connect different calibration impedances in series with the switch means so as to control the spacing of the lines on the oscillograph.

7. Apparatus for measuring voltage changes, said apparatus including two terminals across which is to be connected a circuit in which the voltage change is to be measured, a blocking impedance in series with the circuit to be measured, a power source connected across the series blocking impedance and circuit to be measured, a cathode ray oscillograph connected across said terminals through an amplifier for indicating a line representing a normal voltage across the terminals, a calibration circuit also connected across said terminals, a plurality of calibration impedances each of which is of predetermined value, an alternating-current amplifier connected across the series circuit, an oscillograph to which the output of the amplifier is supplied, the calibration circuit being connected in parallel with said circuit to be measured and supplied from the same power source that supplies said circuit to be measured, a movable conductor for connecting selected impedances in the calibration circuit, a switch in series with the selected calibration impedance, motor means that opens and closes the switch in accordance with a consistently repetitive movement, and a controller operable to start the motor means.

GREER ELLIS.

REFERENCES CITED

The following references are of record in the file of this patent:

UNITED STATES PATENTS

| Number | Name | Date |
| --- | --- | --- |
| 2,186,006 | Buckingham | Jan. 9, 1940 |
| 2,439,050 | Mallory | Apr. 5, 1948 |
| 2,466,746 | Shive | Apr. 12, 1949 |
| 2,471,530 | Lobel | May 31, 1949 |
| 2,548,276 | Weisbecker | Apr. 10, 1951 |
| 2,567,575 | Olson | Sept. 11, 1951 |